United States Patent
Hsu et al.

(10) Patent No.: US 9,201,132 B2
(45) Date of Patent: Dec. 1, 2015

(54) ANTI-GEOLOCATION

(75) Inventors: Mark Hsu, La Jolla, CA (US); David Smith, Ellicott City, MD (US); Jeremy Rode, San Diego, CA (US); Anis Husain, San Diego, CA (US); Maha Achour, Encinitas, CA (US)

(73) Assignee: ZIVA CORPORATION, San Diego, CA (US)

( * ) Notice: Subject to any disclaimer, the term of this patent is extended or adjusted under 35 U.S.C. 154(b) by 595 days.

(21) Appl. No.: 13/462,514

(22) Filed: May 2, 2012

(65) Prior Publication Data
US 2012/0328037 A1    Dec. 27, 2012

Related U.S. Application Data

(63) Continuation-in-part of application No. 13/440,796, filed on Apr. 5, 2012, now abandoned.

(60) Provisional application No. 61/481,717, filed on May 2, 2011, provisional application No. 61/481,720, filed on May 2, 2011, provisional application No. 61/540,307, filed on Sep. 28, 2011, provisional application No. 61/476,205, filed on Apr. 15, 2011.

(51) Int. Cl.
*G01S 1/72*    (2006.01)
*G01S 7/481*   (2006.01)
*H04B 7/04*    (2006.01)

(52) U.S. Cl.
CPC ............... *G01S 1/725* (2013.01); *G01S 7/4814* (2013.01); *H04B 7/0413* (2013.01)

(58) Field of Classification Search
CPC ............ G01S 1/76; G01S 5/02; G01S 17/87; G01S 19/14; G01S 7/4814; G01S 7/4816
See application file for complete search history.

(56) References Cited

U.S. PATENT DOCUMENTS 6,834,043 B1 *  12/2004  Vook et al. ............... 370/310
2003/0073464 A1 *  4/2003  Giannakis et al. ......... 455/562
(Continued)

FOREIGN PATENT DOCUMENTS

WO  PCT/US2006/060916    5/2007
WO  WO2007059508    *   5/2007

OTHER PUBLICATIONS

Jin et al., Time-Reversal Detection Using Antenna Arrays, IEEE Transactions on Signal Processing, 2009, 1396-1404, vol. 57, No. 4, doi: 10.1109/TSP.2008.2010425.

(Continued)

*Primary Examiner* — Leon-Viet Nguyen
*Assistant Examiner* — Sarah Hassan
(74) *Attorney, Agent, or Firm* — Anatoly S. Weiser, Esq.; Techlaw LLP

(57) ABSTRACT

Methods, apparatus, and articles of manufacture make Geolocation of a source transmitter more difficult or impossible. Scatterers common to a source transmitter and an intended receiver are identified using a variety of techniques, such as iterative time reversal (ITR) and Singular Value Decomposition (SVD) of a scatter matrix. The source transmitter then uses time reversal and knowledge of the signatures of the scatterers to focus its transmissions on one or more of the scatterers, instead of the intended receiver. The source transmitter may have multiple antennas or antenna elements. The source transmitter and/or the intended receiver may include antenna elements with Near-Field Scatterers to enable spatial focusing below the diffraction limit at the frequencies of interest. The source transmitter may be a plurality of ad hoc nodes cooperating with each other.

18 Claims, 8 Drawing Sheets

(56) References Cited

U.S. PATENT DOCUMENTS

| | | | |
|---|---|---|---|
| 2003/0215005 A1* | 11/2003 | Kontola et al. | 375/149 |
| 2004/0013211 A1 | 1/2004 | Lindskog et al. | |
| 2004/0082303 A1* | 4/2004 | Giannakis et al. | 455/130 |
| 2004/0156443 A1 | 8/2004 | Dent | |
| 2005/0128966 A1* | 6/2005 | Yee | 370/310 |
| 2006/0085497 A1* | 4/2006 | Sehitoglu | 708/405 |
| 2008/0198695 A1* | 8/2008 | Abdi | 367/134 |
| 2010/0316163 A1* | 12/2010 | Forenza et al. | 375/296 |
| 2011/0002410 A1 | 1/2011 | Forenza et al. | |
| 2011/0286508 A1 | 11/2011 | Smith et al. | |
| 2012/0263056 A1 | 10/2012 | Smith et al. | |
| 2012/0280862 A1* | 11/2012 | Moffatt et al. | 342/386 |

OTHER PUBLICATIONS

Lemoult et al., Resonant Metalenses for Breaking the Diffraction Barrier, Phys. Rev. Lett., 2010, 203901, vol. 104, No. 20 (4 pages).

Lerosey et al., Focusing Beyond the Diffraction Limit with Far-Field Time Reversal, Science, 2007, 1120-1122, vol. 315, No. 5815.

Zmuda et al., Expermental Results for a Photonic Time Reversal Processor for Adaptive Control of an Ultra Wideband Phased Array Antenna, in Hayduk et al. (Eds)., Proc. Spies, Enabling Photonics Technologies for Defense, Security, and Aerospace Applications IV, vol. 6975, 697504 (7 pages), doi: 10.1117/12.783968.

* cited by examiner

ANTI-GEOLOCATION

CROSS-REFERENCE TO RELATED APPLICATIONS

The present application claims priority from (1) U.S. Provisional Patent Application Ser. No. 61/481,717, entitled ANTI-GEOLOCATION USING TIME REVERSAL (ANGLER), filed on 2 May 2011; (2) U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011; and (3) U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011; the present application is a continuation-in-part of (4) U.S. patent application Ser. No. 13/440,796, entitled APPARATUS, METHODS, AND ARTICLES OF MANUFACTURE FOR WIRELESS COMMUNICATIONS, filed on 5 Apr. 2012, which claims priority from U.S. Provisional Patent Application Ser. No. 61/476,205, entitled TIME REVERSAL COMMUNICATION SYSTEMS WITH NEAR-FIELD SCATTERERS, filed on 15 Apr. 2011; the present application is also related to (5) patent application PCT/US12/36180 under the Patent Cooperation Treaty, entitled DISTRIBUTED CO-OPERATING NODES USING TIME REVERSAL, by the same inventors as the present patent application, filed on 2 May 2012. Each of these patent documents is hereby incorporated by reference in its entirety as if fully set forth herein, including text, figures, claims, tables, and computer program listing appendices (if present).

FIELD OF THE INVENTION

This document relates generally to the field of Geolocation and Geolocation prevention.

BACKGROUND

Geolocation refers to the process of determining geographic location of a subject of the process. The concept of Geolocation includes both source Geolocation, i.e., Geolocation of a transmitter (such as a cellular telephone, communication radio, radar); and self-Geolocation, i.e., Geolocation of the subject by the subject itself.

Source Geolocation is a classical problem for identifying the location of a transmitter, often done using triangulation. Passive Geolocation is commonly used to locate accurately a transmitter using multiple receivers (or, more precisely, receiver antennas) in non-multipath environments. Several triangulation methods may be used to locate signal sources in line-of-sight (LoS) environments. Geolocation of transmitters may use multilateration (e.g., triangulation) approaches, often with Time of Arrival (ToA), angle-of-arrival (AoA), power-of-arrival (PoA), frequency of arrival (FoA), and/or Time Difference of Arrival (TDoA) estimation techniques. Angle-of-Arrival, PoA, and FoA metrics may require favorable operating conditions. If the signal start time is known, ToA can be converted to range estimation. Emission time, however, is generally not available in the case of geolocation of a non-cooperative (hostile) transmitter.

In TDoA measurements, the signal of the transmitter is received at multiple receivers with distance-dependent time delays. Correlation analysis provides a time delay of the transmit signal corresponding to the path length difference to receiver pairs. When the signal is received at two receivers at known locations and TDoA, the intersection of possible transmitter locations lies on one half of a two-sheeted hyperboloid. Adding a third receiver at a third known location provides a second TDoA measurement (i.e., a second hyperboloid) with the location of the transmitter at the intersection of these two hyperboloids in two dimensions. A fourth receiver may enable measurement of a third hyperboloid, resulting in a determination of the transmitter location in three dimensions. Time Difference of Arrival techniques can be quite accurate for passive location estimation of a transmitter, including non-cooperative transmitter, when three or more receivers are available.

Geolocation may use Channel Impulse Response (CIR) estimations. In non-multipath environments, the CIR exhibits a single peak corresponding to the direct LoS. In this case, TDoA may be employed, because time of arrival can be determined directly from the peak.

In a multipath (MP) environment, a transmitted signal may be subjected to multiple scattering, resulting in a linear combination of delayed, attenuated, and Doppler-shifted versions of the original transmitted signal detected by the receivers along different paths. It follows that the CIR will exhibit multiple peaks and consequential uncertainty regarding which peak is the LoS peak, if LoS is present at all. Therefore, with significant MP contributions and/or without Los, the CIR may have multiple peaks, and measuring time of arrival becomes more difficult. Accurate and robust location estimation is thus challenging in harsh MP environments, with their time-varying MP fading and co-channel interference.

Low probability of intercept (LPI) communication techniques, such as direct sequence spread spectrum and frequency hopping, operate at instantaneous or average power levels that may be lower than ambient noise power levels. Such communication techniques present difficult scenarios for geolocation of non-cooperative transmitters. Low Probability of Intercept techniques may not communicate reliably in Non-Line-of-Sight (NLoS) multipath environments without incorporating Multiple-Input-Multiple-Output (MIMO) technologies. Geolocating signal transmitters in NLoS environments is more difficult, but possible with MP scattering. Multiple-Input-Multiple-Output systems generally have to ensure adequate decorrelated paths through the multipath environment, which means that they may transmit signals in all directions, allowing hostile receivers not only to detect but also to locate them, e.g., by combining triangulation and TDoA techniques.

Geolocation of hidden transmitters in an MP environment may be possible with recently developed processing techniques. The reason for this is that when the source is an NLoS source, a triangulation, by the hostile observer employing an array may first be used to locate the primary scatterer locations (from the point of view of the observer), and then iteratively find other scatterers and the original transmitter. This process is described in U.S. Provisional Patent Application Ser. No. 61/586,675, entitled Geolocation, filed on Jan. 13, 2012; and in U.S. Provisional Patent Application Ser. No. 61/597,492, entitled Geolocation, filed on Feb. 10, 2012. Each of these provisional patent applications (which are commonly owned with the present application and which were filed in the name of one of the inventors herein) is hereby incorporated by reference in its entirety as if fully set forth herein, including text, figures, claims, tables, computer program listing appendices (if present). In sum, TDoA techniques make geolocation possible when there are three or more discrete scatterers in the field. Each of these scatterers can be treated as a virtual antenna to enable both direction and distance of the source to be determined uniquely.

There is a need for techniques to hide transmitter locations in multipath environments in real-time, to prevent hostile receivers from locating signal transmitters, without unduly disrupting communications between the transmitters and their intended receivers.

SUMMARY

Embodiments, variants, and examples described in this document are directed to methods, apparatus, and articles of manufacture that may satisfy one or more of the above described and/or other needs.

Selected examples described in this document rely on obtaining steering vectors for scatterers common to the intended receiver and the transmit array. One of the methods employed for this purpose is the application of Singular Value Decomposition (SVD) processing to the time reversal operator. It may be a frequency domain operation using, for example, Fast Fourier Transforms (FFTs) and inverse FFTs (IFFTs). There are other methods to attribute groups of pulses to scatterers across a distributed array using the positional layout of the antenna array and identifying patterns. Using knowledge of the spatial layout of the receiver array, one can identify which pulses come from which scatterer, and effectively null energy on that scatterer in the time domain. This may be done by first detecting patterns in the arrival times consistent with the known array layout and determining commonality across the array. After identification of time of arrival of the scatterer to be nulled across the array, the peak at that time slot may be removed in the time-reversed transmission. Upon transmission of the new time-reversed signal, energy to that target scatterer will not align coherently in time and space, resulting in suppression of energy at that scatterer. This is equivalent to nulling the steering vector to that scatterer without frequency domain processing. Other methods may include using common symmetric time axes across the nodes, which may eliminate the need for positional information. The ability to null energy on a particular scatterer (and consequently the ability to focus on a particular scatterer by nulling energy on other scatterers) may be used to make a transmission appear (to a hostile receiver) to come from the focused-on scatterer, instead of the actual transmitter.

In an embodiment, a method of transmitting data from a first radio frequency communication system to a second radio frequency communication system is disclosed. The method includes receiving by a plurality of antennas of the first radio frequency communication system waveforms that resulted from sounding environment using one or more channel sounding bursts transmitted from the second radio frequency communication system, the waveforms including reflections of the one or more channel sounding bursts from one or more scatterers. The method also includes processing the waveforms using time-reversal and Singular Value Decomposition to (1) select a first selected scatterer from the one or more scatterers, and (2) determine first signatures for launching from the plurality of antennas a first transmission temporally and spatially focused on the first selected scatterer, each first signature corresponding to a different antenna of the plurality of antennas. The method additionally includes convolving first data with each first signature to obtain first transmission waveforms, a first transmission waveform per antenna of the plurality of antennas. The method further includes transmitting the first transmission waveforms from the antennas of the plurality of antennas, each first transmission waveform transmitted through the antenna corresponding to each first transmission waveform, so that the first data is temporally and spatially focused on the first selected scatterer.

In an embodiment, a method of transmitting data from a first radio frequency communication system to a second radio frequency communication system is disclosed. The method includes sounding environment using channel sounding bursts transmitted from a plurality of antennas of the first radio frequency communication system, wherein reflections of the channel sounding bursts are received by the plurality of antennas. The method also includes assembling a scatter matrix from information obtained in the step of sounding. The method additionally includes applying time-reversal to the scatter matrix to obtain a time-reversed scatter matrix. The method further includes performing Singular Value Decomposition (SVD) to the time-reversed scatter matrix to obtain first automatic focusing parameters for focusing radio frequency transmission of the plurality of antennas on a first scatterer. The method further includes making a first transmission of the data to the second radio frequency communication system through the plurality of antennas so that the first transmission is focused on the first scatter using the first automatic focusing parameters.

In an embodiment, a method of transmitting data from a first radio frequency communication system to a second radio frequency communication system is described. The method includes performing iterative time reversal (ITR) at the first radio frequency communication system to obtain information for focusing in space and time a plurality of antennas of the first communication system on a scatterer. The method also includes making a transmission of the data to the second radio frequency communication system through the plurality of antennas so that the transmission is focused on the scatterer using the information for focusing.

In an embodiment, a radio frequency communication system has at least one transmitter, at least one receiver, a plurality of antennas coupled to the transmitter and the receiver; and at least one processor coupled to the at least one transmitter and the at least one receiver, to control operation of the at least one receiver and the at least one transmitter. The at least one processor is configured to execute code to cause the radio frequency communication system to receive by the plurality of antennas waveforms that resulted from sounding environment using one or more channel sounding bursts transmitted from an intended receiver, the waveforms including reflections of the one or more channel sounding bursts from one or more scatterers; to process the waveforms using time-reversal and Singular Value Decomposition to (1) select a first selected scatterer from the one or more scatterers, and (2) determine first signatures for launching from the plurality of antennas a first transmission temporally and spatially focused on the first selected scatterer, each first signature corresponding to a different antenna of the plurality of antennas; to convolve first data with each first signature to obtain first transmission waveforms, a first transmission waveform per antenna of the plurality of antennas; and to transmit to the intended receiver the first transmission waveforms from the antennas of the plurality of antennas, each first transmission waveform transmitted through the antenna corresponding to each first transmission waveform, so that the first data is temporally and spatially focused on the first selected scatterer.

These and other features and aspects of selected embodiments not inconsistent with the present invention will be better understood with reference to the following description, drawings, and appended claims.

DETAILED DESCRIPTION

Figure 1:
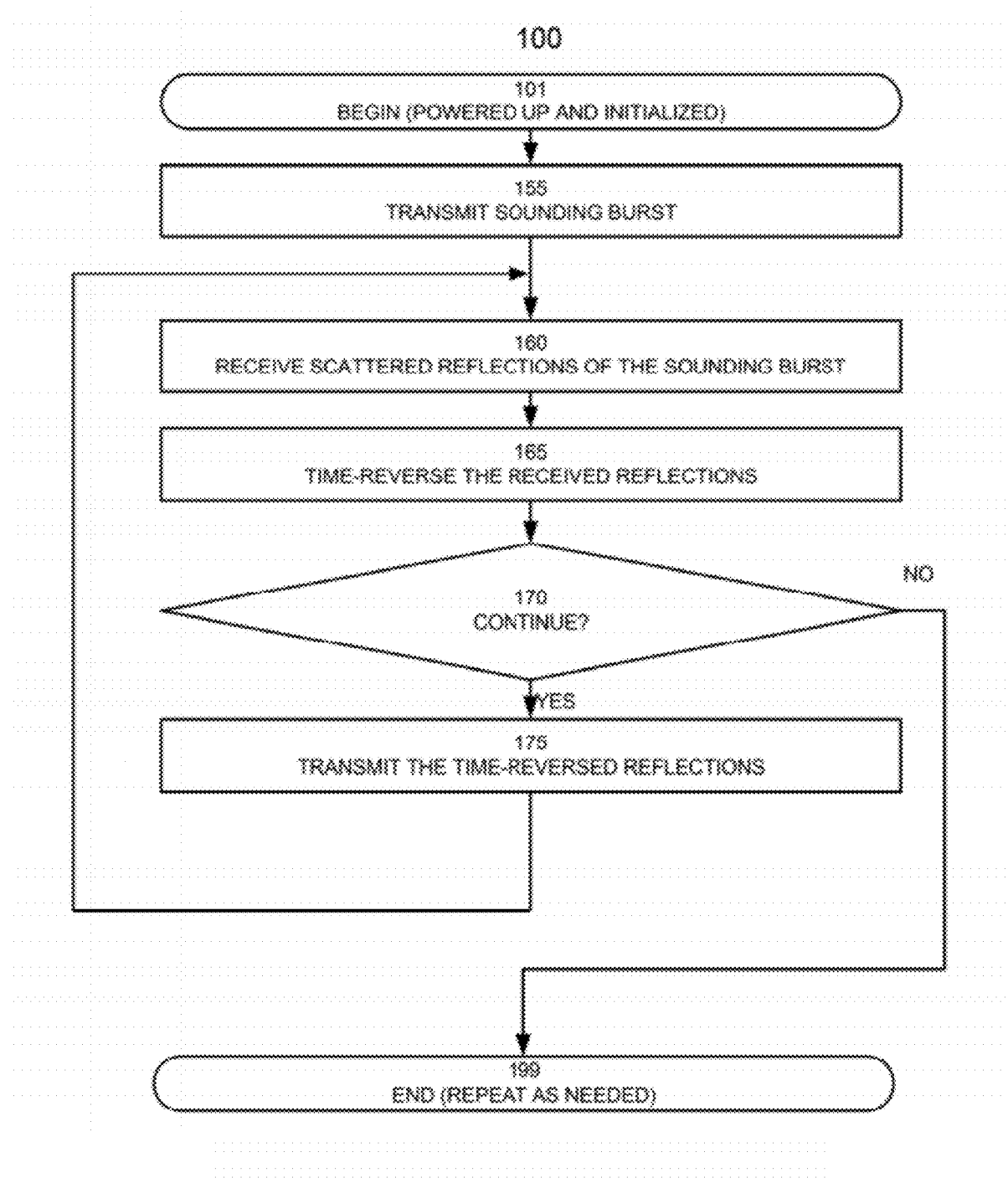
FIGS. 1 and 2 illustrate selective steps of an Iterative Time Reversal process.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization of an embodiment, variant, or example does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning connections through mediate elements.

References to "receiver" ("Rx") and "transmitter" ("Tx") are made in the context of examples of data transmission from the transmitter to the intended receiver. For time reversal communication techniques, the intended receiver may need to transmit to the transmitter a sounding signal, e.g., a pulse/burst or a pilot signal, and the transmitter may need to receive the sounding signal. Moreover, data communications can be bi-directional, with transceivers on both end nodes.

The expression "processing logic" should be understood as selected steps and decision blocks and/or hardware for implementing the selected steps and decision blocks. "Decision block" means a step in which a decision is made based on some condition, and process flow may be altered based on whether the condition is met or not.

Other and further explicit and implicit definitions and clarifications of definitions may be found throughout this document.

Reference will be made in detail to several embodiments that are illustrated in the accompanying drawings. Same reference numerals may be used in the drawings and this description to refer to the same apparatus elements and method steps. The drawings are in a simplified form, not to scale, and omit apparatus elements and method steps that can be added to the described systems and methods, while possibly including certain optional elements and/or steps.

In order to locate a hidden source by observing its emissions, a geolocation procedure may first use triangulation to determine the position of the multipath scatterers reflecting the energy, and then use the identified scatterers as a secondary virtual antenna array to geolocate the hidden source. This may require N+1 discrete scatterers, where N is the number of spatial dimensions to which we are constrained, to enable both the direction and the distance of the source to be determined uniquely. For signals propagating in a 2D plane approximately parallel to the ground, three scatterers may be needed. For signals from all directions in a 3D space, four scatterers are generally needed. Dynamic and controlled manipulation of a time-reversed multipath scattering field can therefore be used for focusing transmit signals onto a single scatterer (or sequentially on single scatterers) and null or significantly reduce the signal at other scatterers, inhibiting geolocation. If a transmitter reduces the number of scatterers it illuminates with its signal to fewer than three or four, it becomes more difficult to use triangulation from the scattered signal to locate the transmitter. This can be used to fool an enemy into thinking the signal is being emitted from the location of the scatterer (e.g., a building) rather than the true source. It may also have an advantage of preventing application of triangulation and TDoA techniques to geolocate the transmitter. Further, the target scatterer can be used as a virtual "repeater" node to relay information to the base station. The technique uses an array of antenna elements at the transmitter and may sacrifice some MP gain. Furthermore, some commonality between multipath scatterers observed by the intended receiver and the hostile observer may need to be present.

Time Reversal (TR) is a set of communication techniques that uses the reciprocity property of wave equations. Time reversal is described, for example, in U.S. patent application Ser. No. 13/142,236, entitled TECHNIQUES AND SYSTEMS FOR COMMUNICATIONS BASED ON TIME REVERSAL PRE-CODING, filed on 3 Sep. 2010, by David F. Smith and Anis Husain. This application is hereby incorporated by reference in its entirety, as if fully set forth herein, including text, figures, claims, tables, and computer program listing appendix (if present). Briefly, in a system that uses time reversal, a pilot (e.g., a sounding burst) is sent from the target antenna of the Rx to the Tx; the Tx receives the pilot and captures in its analog-to-digital converter (ADC) the Channel Response (CR) of the channel between the Rx antenna and the Tx. The Tx may then be configured to send data back to the Rx by convolving the data with the time-reversed version of the captured CR. Standard modulation techniques can be used to apply the data to the signal by convolving a binary data stream with the time-reversed CR (TR-CR). For example, the Tx may be configured to use the TR-CR as its data pulse/burst. When the TR-CR is launched back down the same channel by the Tx, the actual physical channel that created the multipath now acts as its ideal (or near ideal, as the case may be in the real world) spatial-temporal matched filter and becomes a perfect (or near perfect) equalizer for the signal, creating a pulse at the intended receiver that captures much of the energy present in the original CR. In effect, this can create significant multipath gain. Communication systems employing TR also have the flexibility to operate in 1×N or M×N antenna configurations, with the ability to derive additional gain over and above the MP gain. The systems can focus a signal both spatially and temporally at a designated point in space within the diffraction limits. They can operate with no LoS visibility of the receiver, no knowledge of the location of receiver, and no array or dish antenna at the transmit end of the link. Additionally, there is no requirement to sweep or scan the Tx array, and the process does not require complex space-time algorithmic processing or calculation, or implementation of a Rake filter to remove the signal distortion created by long MP decay times.

The sounding burst may be a sharp pulse approaching an impulse, a Gaussian burst, or another appropriate burst with substantially flat frequency response in the communication band, and having a good autocorrelation function (i.e., approaching that of an impulse function), as is known in communication theory and related fields (e.g., CDMA, auto-correlation radar).

Figure 2:
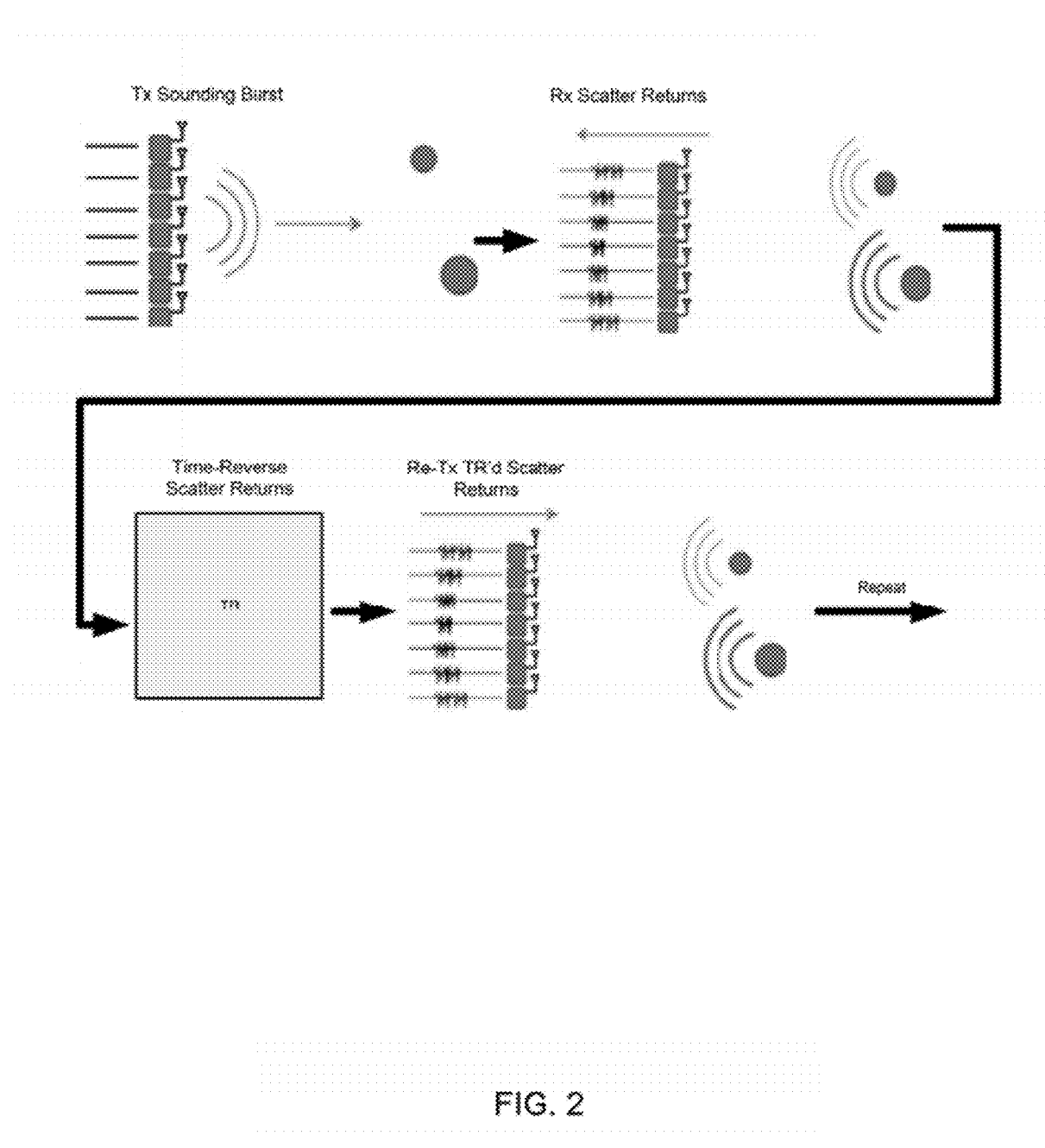

Iterative Time Reversal (ITR) is a method for using TR to focus on a scatterer (as opposed to the eventual intended receiver) in the field. The scatterer may be, for example, the strongest scatterer in the field as viewed from the transmitter's location. FIG. 1 shows selective steps of an ITR process 100, and FIG. 2 illustrates some of the steps in a graphic manner.

The process 100 begins at flow point 101, at which point the apparatus performing the process 100 (a transceiver, for example) is powered up and initialized. In steps 155 and 160, respectively, the channel is sounded using an initial sounding burst (e.g., a burst substantially flat in frequency response and with a good autocorrelation function) with one or more antenna elements, and the scattered reflections of the burst are received by all antenna elements of the transceiver. The signals received by the antenna elements are then time-reversed in step 165. In decision block 170, a test is performed and a decision is made whether the process should continue, that is, whether the scatterer's signature has not yet been determined with sufficient precision. If the test indicates that the process should continue, the latest time-reversed reflections are transmitted in step 175, and then the process flow returns to the step 160. Thus, the steps 160, 165, and 175 may be repeated sequentially, i.e., each time each of the return signals is time-reversed and again re-transmitted from the antenna element corresponding to the signal.

After several iterations, as determined in decision block 170, the signal energy should automatically focus on the strongest scatterer in the field, and the process terminates at flow point 199. In some embodiments, the number of iterations is predetermined, e.g., 1, 2, 3, 4, 5, or greater. In other embodiments, the iterations continue for a predetermined time period. In still other embodiments, the transceiver performing the ITR process 100 looks at the changes in the reflected or time reversed signals, to detect when the signals stabilize from one iteration to the next. There may be other approaches and variants/combinations of the approaches discussed in this paragraph for determining the number or duration of the iterations.

Once focused, the latest signatures for the antenna elements can be used to focus a subsequent data transmission on the scatterer. In other words, the data stream can be convolved with the signatures, and the resulting waveforms can then be transmitted from the respective antenna elements. For example, if the time-reversed signature for an antenna element n is Sn, and the data stream is D, then the product of the convolution of Sn and D can be transmitted from the antenna element n. This is repeated for other antenna elements, and the transmissions are made simultaneously.

The process 100 then terminates at flow point 199, and may be repeated as needed.

Another way to focus on a scatterer (as opposed to the eventual intended receiver) in the field is by a process of Singular Value Decomposition (SVD) applied to a scatter matrix (a k a environment transfer response matrix). In accordance with this approach, time reversal signals of an array at the transmit node can be mathematically decomposed into a sum of distinct eigenfunctions/eigenstates/eigenvalues or singular states; each eigenstate represents a path from the transmit node to the receiver through only one scatterer. If the transmit antenna (array) transmits only one of these singular states, then the signal is focused at the scatterer represented by that state and the signals incident on the other scatterers are nulled or partially nulled. We refer to such focusing as "Selective Focusing by Singular Value Decomposition," or "Selective Focusing by SVD." Although the system may lose multipath TR gain in this mode, it can select which scatterer(s) to illuminate.

Figure 3:
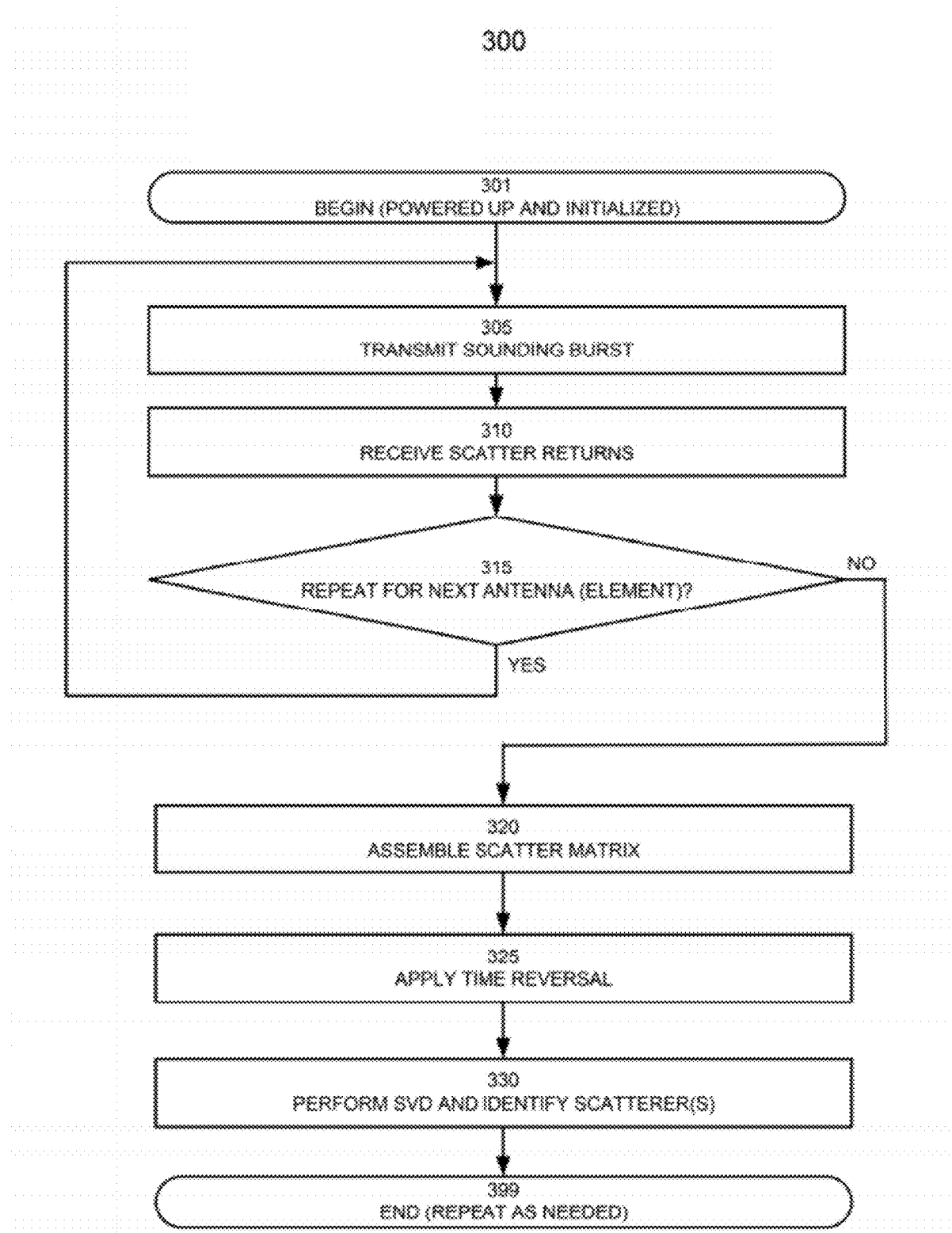
FIG. 3 illustrates selected steps of a process for masking a node's location using Singular Value Decomposition and time reversal with sounding from the transmitter node.
Figure 4A:
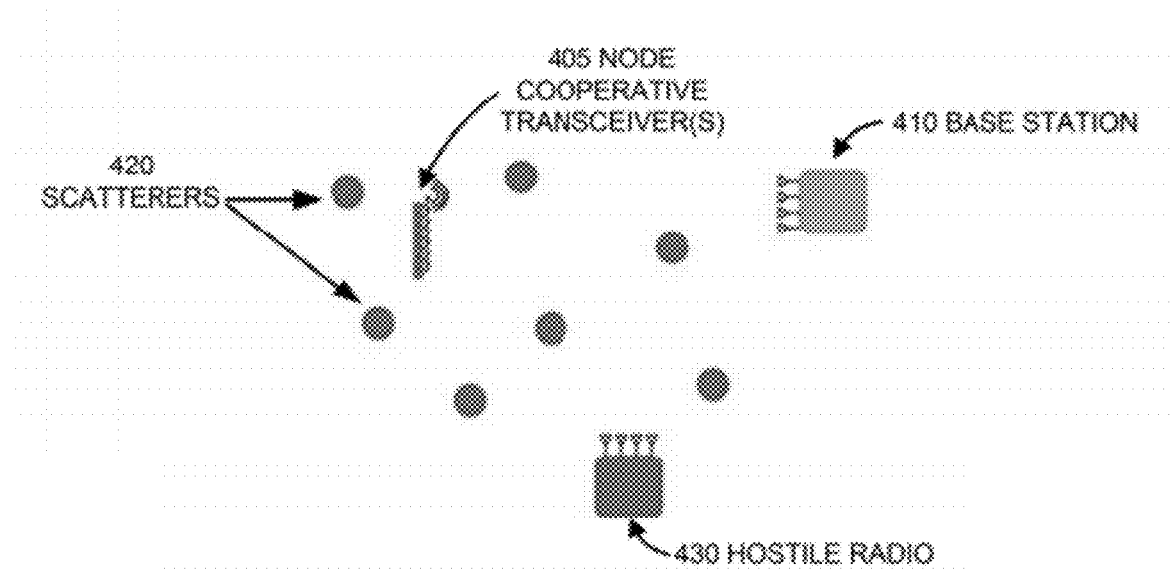
FIGS. 4A and 4B show an exemplary high level representation of an environment including cooperative nodes, hostile receivers, and scatterers, for facilitating discussion of the process of FIG. 3.
Figure 4B:
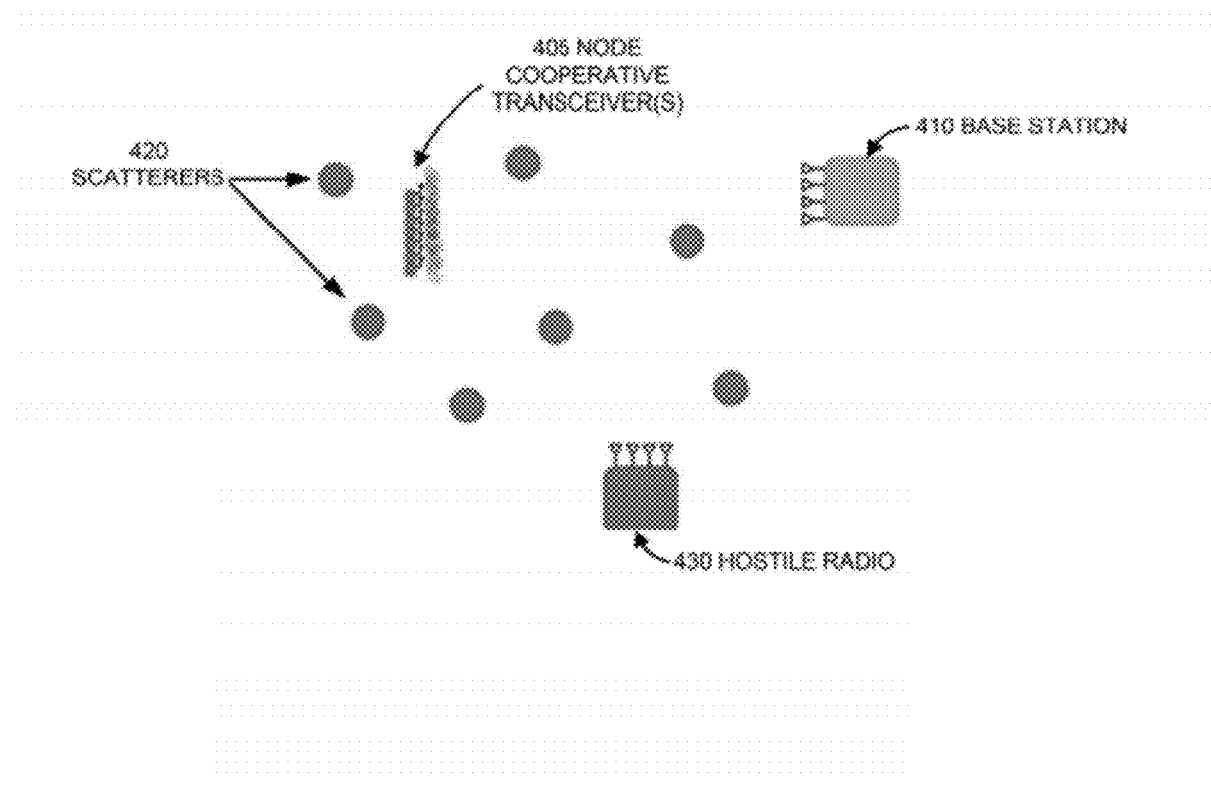

FIG. 3 illustrates selected steps of a process 300 for using SVD to determine the information needed by a node to focus one or more scatterers, to mask the node's location while communicating with friendly base station transceiver(s). FIGS. 4A and 4B, which are used to illustrate further the process 300, show an exemplary high level representation of the node 405, a base station 410 with which the node 405 intentionally communicates, scatterers 420 (all round objects in this and other Figures), and a hostile radio 430.

The process 300 begins with flow point 301, where the node 405 is powered up and ready to communicate with the base station 410. In step 305, the node 405 transmits a channel sounding burst from one of its transmit antenna elements (here shown to be the topmost antenna element). In step 310, the plurality of antenna elements of the node 405 receive reflections/returns generated by the scatterers 420 as a result of the sounding burst emitted from the antenna element in the preceding step 305. If the steps have been repeated (during the current process) for all the antenna elements, the process flow continues to step 320.

Decision block 315 causes the steps 305 and 310 to be repeated for each individual antenna element, transmitting a sounding burst from a selected antenna element, and receiving the resulting reflections at all the antenna elements.

In the step 320, the results from the steps 305/310 are assembled into a scatter matrix with each pair-wise sounding. In other words, a matrix is assembled so that where a reflection received at nth antenna element due to a sounding burst emitted from mth antenna element is located at the intersection of nth column and mth row (or vice versa).

In step 325, the scatter matrix is time-reversed, resulting in a TR scatter matrix.

In step 330, Singular Value Decomposition is performed on the TR scatter matrix to calculate eigenvalues/eigenfunctions/eigenvectors corresponding to the scatterers in the field. Singular Value Decomposition is known in linear algebra. Briefly, SVD is a factorization process of an m×n matrix M. The matrix is decomposed or factorized thus: $M = U\Sigma V^*$. In this formula, U stands for a unitary matrix of m×m dimensions; $\Sigma$ stands for a rectangular diagonal matrix of m×n dimensions with non-negative real numbers on its diagonal; and V is a unitary matrix of n by n dimensions.

Each scatterer is identified by corresponding eigenvalue and eigenvector. Each eigenvalue provides scattering strength of the scatterer to which it relates; the eigenvectors provide automatic focusing parameters to focus energy onto the scatterer without the need for sweeping the array to focus.

The process ends at flow point 399. The process may be repeated as needed, for example, periodically, at predetermined times, or otherwise.

Figure 5:
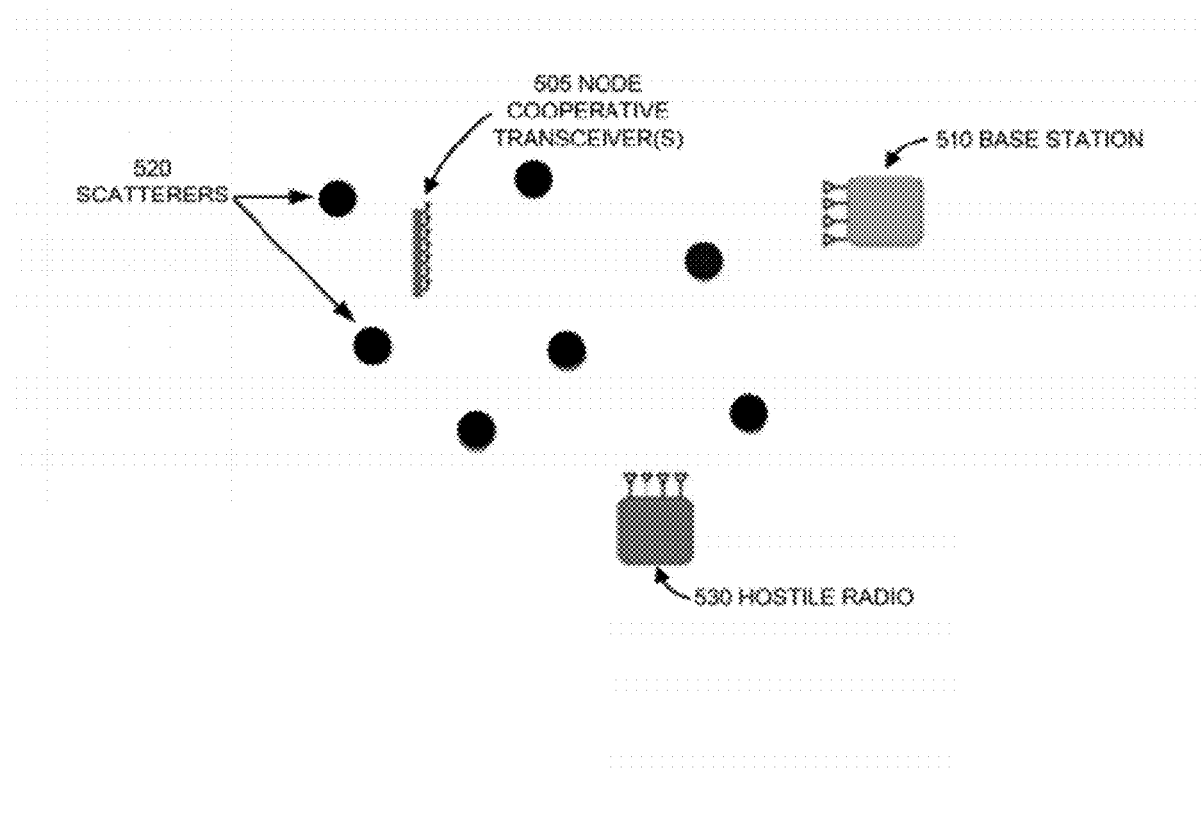
FIG. 5 shows an exemplary high level representation of an environment including cooperative nodes, hostile receivers, and scatterers, for facilitating discussion of a process of the following Figure.
Figure 6:
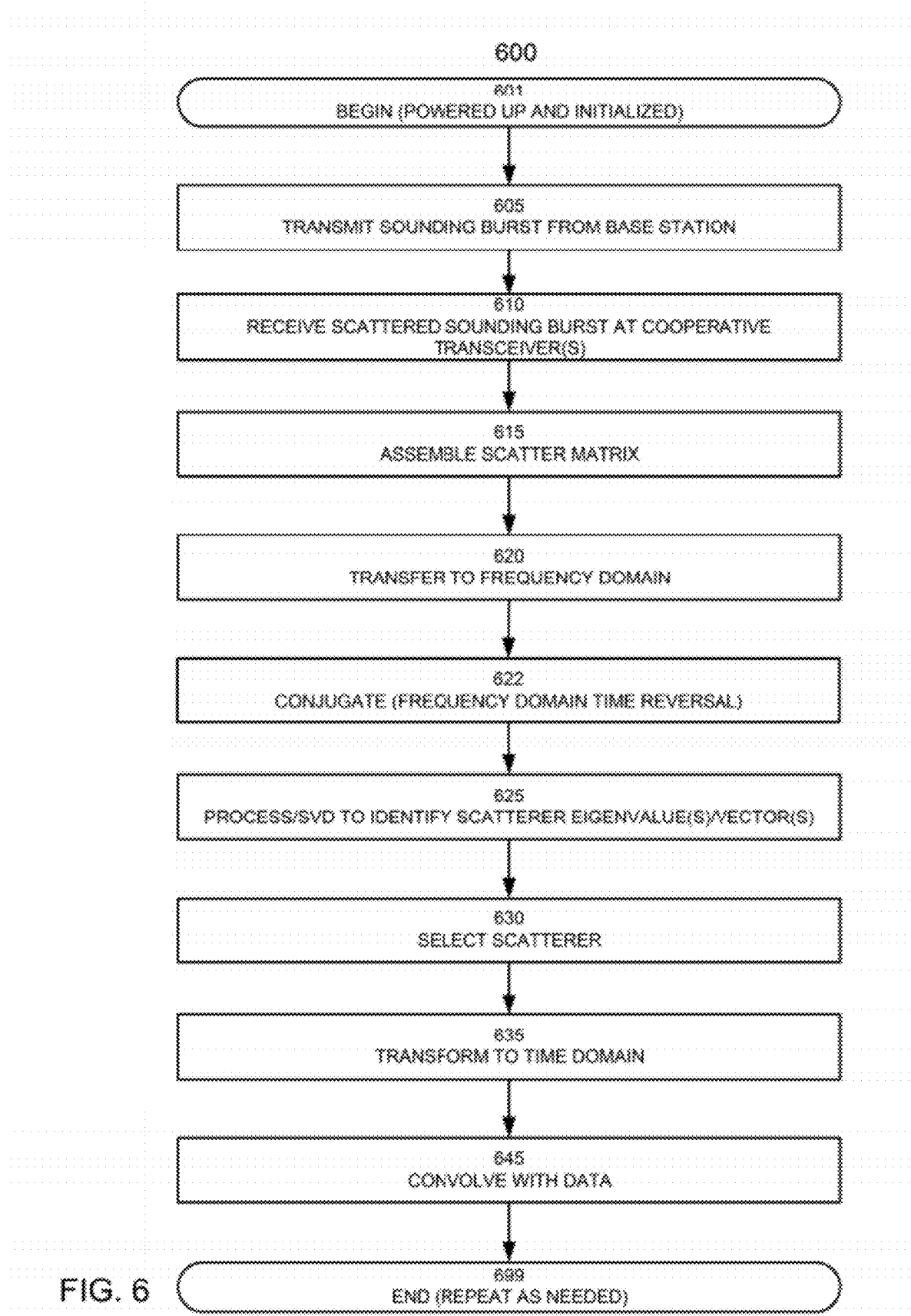
FIG. 6 illustrates selected steps of a process for masking a node's location using Singular Value Decomposition and time reversal with sounding from the intended receiver node.

In other embodiments, a node (e.g., a cooperative transceiver 505 shown in FIG. 5, or a plurality/cluster of such cooperative transceivers 505) identifies scatterers (e.g., scatterers 520) in the channel between the node and another node (the base station 510) using a burst sent from the other node (the base station 510). The cooperative transceiver(s) 505 can then focus on an individual scatterer 520 when transmitting to the base station 510, creating a virtual source heard by a hostile transceiver 530. FIG. 6 illustrates selective steps of a process 600 using this technique.

At flow point 601, the cooperative transceiver 505 (which term also applies to a plurality of transceivers 505) and the base station 510 are powered up, initialized, and ready to perform the steps of the process 600. In step 605, the base station 510 transmits a sounding burst to the cooperative transceiver 505. The base station 510 may transmit the burst using a single antenna or a plurality of antennas or antenna elements. The burst can be a sharp pulse approaching an impulse, a Gaussian burst, or another appropriate burst with substantially flat frequency response in the communication band, and having a good autocorrelation function approaching that of an impulse function, as is known in the communication theory and related fields (e.g., CDMA, autocorrelation radar).

In step 610, the cooperative transceiver 505 receives, captures, samples, and stores the received sounding burst at a plurality of antennas (antenna elements). The burst is captured, sampled, and stored for each of the individual antennas or antenna elements.

In step 615, the cooperative transceiver 505 assembles a scatter matrix. For example, the sounding burst samples for each of the antenna elements of the cooperative transceiver 505 becomes a row (or a column) of the scatter matrix. Note that the rows (or columns, as the case may be) are in time domain, because they contain individual time-ordered samples.

In step 620, the cooperative transceiver 505 transforms each of the rows (or columns, as the case may be) into the frequency domain, resulting in a frequency domain scatter matrix.

In step 622, the cooperative transceiver 505 conjugates (applies complex conjugation to) the frequency domain scatter matrix, to obtain a conjugate frequency domain scatter matrix. This step in the frequency domain is analogous to time reversal in the time domain.

In step 625, the cooperative transceiver 505 processes the conjugate of the frequency domain scatter matrix using SVD, to identify the signature of each scatterer by its eigenvalue and eigenvector. Having thus identified the signatures of the individual scatterers, the cooperative transceiver 505 has the ability to launch signals temporally and spatially focused on individual scatterers.

In step 630, the cooperative transceiver 505 selects a scatterer 510 for focusing the transmission. The cooperative transceiver 505 may make this selection, for example, by selecting the strongest scatterer, or by randomly or pseudo-randomly cycling through the N strongest scatterers (N being a predetermined number). In cycling through the scatterers, the cooperative transceiver 505 may create a "walking" appearance, by sequentially changing focus from one scatterer to another. To the hostile transceiver, this may create an appearance of a moving transmission source. Other selection methods may also be used.

In step 635, the cooperative transceiver 505 transforms the vector corresponding to the selected scatterer back into time domain. We will refer to the resulting time domain vector as selected time domain vectors.

In step 645, the cooperative transceiver 505 convolves the data (intended for transmission to the base station 510) with the selected time domain vectors, obtaining the waveforms for transmission from each of the antennas or antenna elements.

In step 650, the cooperative transceiver 505 transmits, from its respective antennas or antenna elements, the waveforms obtained in the step 645.

The process flow then terminates at flow point 699. The steps 645-650 may be repeated for additional data, as needed; furthermore, all the steps may be repeated as needed, to enable the cooperative transceiver 505 to focus on the individual scatterers 520 in a dynamically changing environment, or to create a "walking" appearance.

In variants, the process 600 is modified so that the processing takes place in the time domain. For example, the steps 620 and 635 may be omitted, the complex conjugation of the step 622 may be replaced by time-reversal in the time domain, and the processing of the step 625 may be performed in the time domain. The cooperative transceiver 505 is thus configured to processes the scatter matrix using SVD in the time domain, to identify the signature of each scatterer by its eigenvalue, eigenvector, and/or eigenfunction.

In variants, the step 625 (whether performed in the frequency or the time domain) is modified to identify the signature of each scatterer using one or more techniques other than SVD.

The transmissions made by the cooperative transceiver 505 using the process 600 (including its variants) can thus be used to create a virtual source that may be heard by both the base station 510 and the hostile transceiver 530. The base station 510 detects the transmissions scattered off of the selected (targeted) scatterer. The hostile transceiver 530 may also detect the scattered signal transmissions, but may lack information sufficient to geolocate the real source of the transmissions.

Further, the cooperative transceiver 505 may in fact be made up of two or more ad hoc transceivers that are collaborating with each other, as is described in U.S. Provisional Patent Applications with Ser. Nos. 61/540,307 and 61/481,720, as well as in a counterpart patent application under the Patent Cooperation Treaty PCT/US12/36180, claiming priority to these provisional applications) to be filed on 2 May 2012, the same date as the present application. The nodes are ad hoc in the sense that they are free to move and rotate not only relative to each other. The distances between any two of the ad hoc nodes are typically much smaller (by a factor of 10, for example) than the distance between any of the nodes and the base station 510. Additionally, the ad hoc nodes are not tethered to each other, so that each of the nodes operates using its own physical time reference, and the antennas of the different ad hoc nodes are not electrically connected to each other. In this case of ad hoc nodes, the scattering of the transmissions may mislead the hostile transceiver 530 into believing that fewer cooperative to transceivers are present than their actual number. For example, the plurality of cooperative transceivers 505 may appear to the hostile transceiver 530 as a single transmitter.

For enhanced use of scatterers to communicate from the cooperative transceiver 505 to the base station 510 while maintaining stealth, the base station 510 may also be configured to perform an SVD (or analogous) operation on the environment, albeit from a different geometry, and identify the eigenvalues and eigenvectors of the scatterers from its position. The base station 510 may use any of the processes described in this document with respect to the cooperative transceiver 505, for example, ITR and SVD of a scatter matrix obtained by self-sounding the environment. A mutual scatterer (seen by both the cooperative transceiver 505 and the base station 510) can be identified as an efficient or strong virtual "repeater" node between the cooperative transceiver 505 and base station 510. Strong scatterers of the cooperative transceiver 505 may differ from those of the base station 510. Since the geometry of the scattering field (and scatterers) will be different for the cooperative transceiver 505 and the base station 510, the scatterers may not be able to be easily mapped one-to-one, since scatterers detected from different geometries may not be identical. Therefore, a search technique may be implemented to determine a desirable or optimal scatterer to be used as the virtual repeater node. For example, the Tx (which can be the cooperative transceiver 505 or the base station 510) can cycle through focusing on each scatterer in the intermediate field, while the Rx (conversely, the base station 510 or the cooperative transceiver 505) identifies the strongest return from its perspective, and relays to the Tx the selection of the scatterer to focus on. The cooperative transceiver or the base station transceiver can be used interchangeably to probe scatterers.

An optimal scatterer can also be identified roughly by the product of its scatter strength to the cooperative and base station transceivers. Many intermediate scatterers may be mutually identified by the cooperative and base station transceivers. It follows that overlapping scatterers may be identified as potentially optimized "repeater" nodes for communication. Cross-correlation of intermediate scatterer information may then provide a faster estimation of optimal scatterer nodes, reducing search transmissions detectable by hostile geolocation transceivers.

Singular Value Decomposition can be extended to multiple steps for added anti-geolocation functionality. In the previous description of SVD for anti-geolocation, energy was focused onto an individual scatterer to create a single virtual Tx node. Because SVD enables selectively focusing energy to create virtual Tx nodes, SVD can be performed using virtual Tx nodes with the original Rx array, to selectively focus energy on scatterers with secondary scattering. The transceiver 505 may thus be configured to focus on scatterers to generate secondary scatter response of the environment to the original Rx array. Similar SVD processing results in singular values using secondary echoes. Additional steps of SVD can in principle be applied.

In variants, the shape of the sounding burst is dynamically varied, to make Geolocation still more difficult. The transceiver signal is a convolution of the time reversed channel response and the data content, which may have significant intersymbol interference (ISI). This complex signal is unraveled automatically by TR at the intended receiver. For hostile observers, however, the signal is further scrambled by the multipath of the hostile observer channel—possibly preventing the use of higher network layer information to enhance the physical layer geolocation process. With TR, the pulse can be shape-altered dynamically during communication, without penalty to the intended Rx, but making synchronization for the hostile observers difficult, preventing (or making more difficult) accurate geolocation from triangulation and decoding of content. The sounding bursts can be varied, for example, in accordance with a predetermined sequence of shapes.

Another technique for increasing the difficulty of Geolocation is the use of Near-Field scatterers by the transceiver 505 or a similar node. As described above, the geolocation process may use TDoA information in the Source-Scatterer-Observer channel to perform multilateration, to identify the source location. The hostile observer, however, can also look at reflections or remissions from the receive node in the Source-Base Station primary channel. If TR is used in this channel, each TR pulse actually consists of a temporal mapping of all the TDoA values from the main channel. Hence, if the base station has four or more receive antennas, the hostile observer may be able to recover the TDoA information from each receive antenna and use that array to triangulate the source. The use of Near-Field Scatterers allows resolution of separate channels on antennas with sub-lambda/2 spacing, and thus helps to defeat this countermeasure. Since the hostile observer is not part of the TR channel, the hostile observer may be unable to resolve different signals from antennas spaced less (and substantially less) than ½ wavelength apart, when the hostile observer is observing from the far-field of those antennas. Hence, the hostile observer may be unable to use the scattering from the sub-lambda/2 receiver antennas to triangulate the source. The antennas with Near-Field scatterers may be employed at the transceiver 505 and/or at the base station 510.

Figure 7:
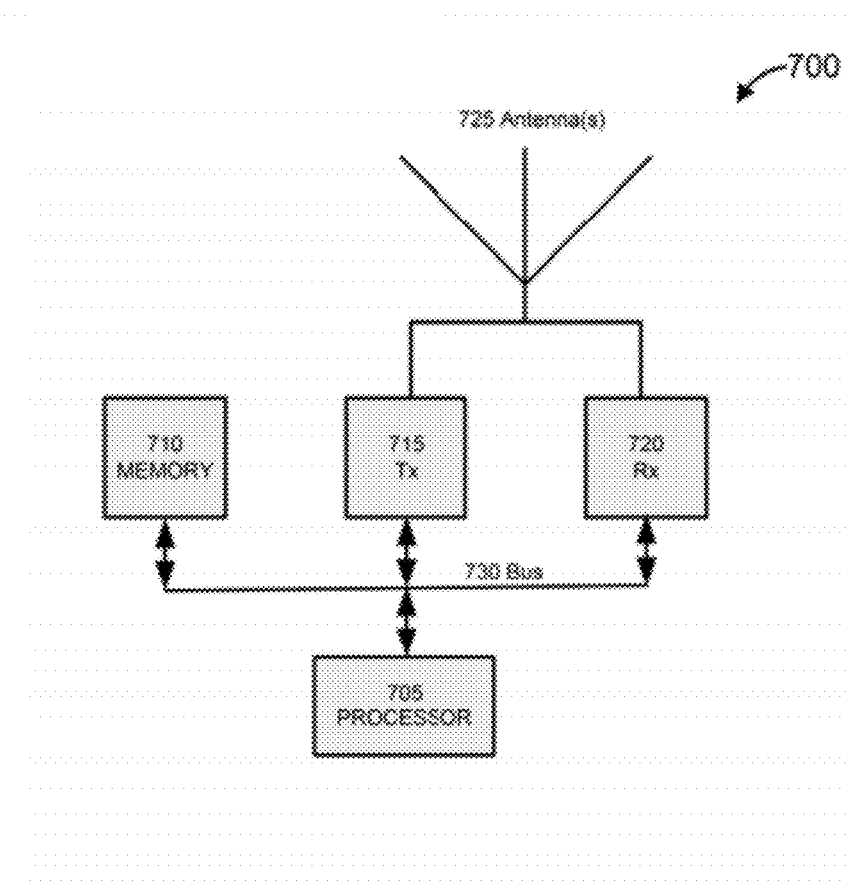
FIG. 7 illustrates selected elements of an apparatus configured in accordance with one or more features described in this document.

FIG. 7 illustrates selected elements of an apparatus configured in accordance with one or more features described in this disclosure. The apparatus, which may be a cooperative transceiver or a base station, may include a processor 705; a storage device 710 (which may store program code for execution by the processor 705); a receiver 715 configured to receive radio frequency transmissions (including scattered/MP transmissions) from one or more other transceivers/base stations; a transmitter 720 configured to transmit radio frequency transmissions to the other transceivers/base stations and to produce scatterer reflections; and one or more transmit and receive antennas 725 coupled to the receiver 715 and the transmitter 720. A bus 730 couples the processor 705 to the storage device 710, the receiver 715, and the transmitter 720, and allows the processor 705 to control operation of these elements.

The embodiments described above are illustrative and not necessarily limiting, although they or their selected features may be limiting for some claims.

The features described throughout this document may be present individually, or in any combination or permutation, except where presence or absence of specific elements/limitations is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

Having thus described in detail selected embodiments, it is to be understood that the foregoing description is not necessarily intended to limit the spirit and scope of the invention(s).

This document describes in detail the inventive apparatus, methods, and articles of manufacture for making Geolocation impossible or more difficult. This was done for illustration purposes only. Neither the specific embodiments of the invention(s) as a whole, nor those of their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The illustrative examples therefore do not necessarily define the metes and bounds of the invention(s) and the legal protection afforded the invention(s).

What is claimed is:

1. A method of transmitting data from a first radio frequency communication system to a second radio frequency communication system, the method comprising steps of:
   receiving by a plurality of antennas of the first radio frequency communication system waveforms that resulted from sounding environment using one or more channel sounding bursts transmitted from the second radio frequency communication system, the waveforms comprising reflections of the one or more channel sounding bursts from one or more scatterers;
   processing the waveforms using time-reversal and Singular Value Decomposition to (1) select a first selected scatterer from the one or more scatterers, and (2) determine first signatures for launching from the plurality of antennas a first transmission temporally and spatially focused on the first selected scatterer, each first signature corresponding to a different antenna of the plurality of antennas;
   convolving first data with said each first signature to obtain first transmission waveforms, a first transmission waveform per antenna of the plurality of antennas; and
   transmitting the first transmission waveforms from the antennas of the plurality of antennas, each first transmission waveform transmitted through the antenna corresponding to said each first transmission waveform, so that the first data is temporally and spatially focused on the first selected scatterer.

2. A method according to claim 1, wherein the step of processing comprises processing in frequency domain.

3. A method according to claim 2, wherein the step of processing in the frequency domain comprises:
   assembling a scatter matrix from the waveforms obtained in the step of receiving;
   transforming the scatter matrix into frequency domain;
   conjugating and applying Singular Matrix Decomposition to the scatter matrix in the frequency domain, to identify the first signatures in the frequency domain; and
   transforming the first signatures to time domain.

4. A method according to claim 2, wherein the step of processing in the frequency domain comprises:
   transforming the waveforms into the frequency domain;
   assembling a scatter matrix in the frequency domain from the waveforms in the frequency domain;
   conjugating and applying Singular Matrix Decomposition to the scatter matrix in the frequency domain, to identify the first signatures in the frequency domain; and
   transforming the first signatures to time domain.

5. A method according to claim 1, wherein the step of processing comprises step of processing in the time domain, the step of processing in the time domain comprising time-reversal.

6. A method according to claim 1, wherein the first selected scatterer is the strongest scatterer.

7. A method of transmitting data from a first radio frequency communication system to a second radio frequency communication system, the method comprising steps of:
   receiving by a plurality of antennas of the first radio frequency communication system waveforms that resulted from sounding environment using one or more channel sounding bursts transmitted from the second radio frequency communication system, the waveforms comprising reflections of the one or more channel sounding bursts from a plurality of scatterers;
   processing the waveforms using time-reversal and Singular Value Decomposition to (1) select a first selected scatterer from the plurality of scatterers, (2) determine first signatures for launching from the plurality of antennas a first transmission temporally and spatially focused on the first selected scatterer, each first signature corresponding to a different antenna of the plurality of antennas, (3) select a second selected scatterer from the plurality of scatterers, the second selected scatterer being different from the first selected scatterer, and (4) determine second signatures for launching from the plurality of antennas a second transmission temporally and spatially focused on the second selected scatterer, each second signature corresponding to a different antenna of the plurality of antennas;
   convolving first data with said each first signature to obtain first transmission waveforms, a first transmission waveform per antenna of the plurality of antennas;
   transmitting the first transmission waveforms from the antennas of the plurality of antennas, each first transmission waveform transmitted through the antenna corresponding to said each first transmission waveform, so that the first data is temporally and spatially focused on the first selected scatterer;
   convolving second data with said each second signature to obtain second transmission waveforms, a second transmission waveform per antenna of the plurality of antennas; and
   transmitting the second transmission waveforms from the antennas of the plurality of antennas, each second transmission waveform transmitted through the antenna corresponding to said each second transmission waveform, so that the second data is temporally and spatially focused on the second selected scatterer.

8. A method according to claim 7, wherein the step of transmitting the first transmission waveforms is performed concurrently with the step of transmitting the second transmission waveforms.

9. A method according to claim 7, wherein the step of transmitting the first transmission waveforms is performed before the step of transmitting the second transmission waveforms.

10. A method according to claim 1, wherein the first communication system comprises a plurality of ad hoc nodes movable relative to each other and synchronized with each other, each ad hoc node of the plurality of ad hoc nodes comprising at least one antenna of the plurality of antennas.

11. A radio frequency communication system, comprising:
at least one transmitter;
at least one receiver;
a plurality of antennas coupled to the at least one transmitter and the at least one receiver; and
at least one processor coupled to the at least one transmitter and the at least one receiver, to control operation of the at least one receiver and the at least one transmitter, the at least one processor configured to execute code to cause the radio frequency communication system to:
receive by the plurality of antennas waveforms that resulted from sounding environment using one or more channel sounding bursts transmitted from an intended receiver, the waveforms comprising reflections of the one or more channel sounding bursts from one or more scatterers;
process the waveforms using time-reversal and Singular Value Decomposition to (1) select a first selected scatterer from the one or more scatterers, and (2) determine first signatures for launching from the plurality of antennas a first transmission temporally and spatially focused on the first selected scatterer, each first signature corresponding to a different antenna of the plurality of antennas;
convolve first data with said each first signature to obtain first transmission waveforms, a first transmission waveform per antenna of the plurality of antennas; and
transmit to the intended receiver the first transmission waveforms from the antennas of the plurality of antennas, each first transmission waveform transmitted through the antenna corresponding to said each first transmission waveform, so that the first data is temporally and spatially focused on the first selected scatterer.

12. A radio frequency communication system according to claim 11, wherein the at least one processor is further configured to execute code to cause the radio frequency communication system to process the waveforms using time-reversal and Singular Value Decomposition in frequency domain by:
assembling a scatter matrix from the waveforms;
transforming the scatter matrix into frequency domain;
conjugating and applying Singular Matrix Decomposition to the scatter matrix in the frequency domain, to identify the first signatures in the frequency domain; and
transforming the first signatures to time domain.

13. A radio frequency communication system according to claim 11, wherein the at least one processor is further configured to execute code to cause the radio frequency communication system to process the waveforms using time-reversal and Singular Value Decomposition in frequency domain by:
transforming the waveforms into the frequency domain;
assembling a scatter matrix in the frequency domain from the waveforms in the frequency domain;
conjugating and applying Singular Matrix Decomposition to the scatter matrix in the frequency domain, to identify the first signatures in the frequency domain; and
transforming the first signatures to time domain.

14. A radio frequency communication system according to claim 11, wherein the at least one processor is further configured to execute code to cause the radio frequency communication system to process the waveforms using time-reversal and Singular Value Decomposition in time domain.

15. A radio frequency communication system according to claim 11, wherein the first selected scatterer is the strongest scatterer.

16. A radio frequency communication system comprising:
at least one transmitter;
at least one receiver;
a plurality of antennas coupled to the at least one transmitter and the at least one receiver; and
at least one processor coupled to the at least one transmitter and the at least one receiver, to control operation of the at least one receiver and the at least one transmitter, the at least one processor configured to execute code to cause the radio frequency communication system to:
receive by the plurality of antennas waveforms that resulted from sounding environment using one or more channel sounding bursts transmitted from an intended receiver, the waveforms comprising reflections of the one or more channel sounding bursts from a plurality of scatterers;
process the waveforms using time-reversal and Singular Value Decomposition to (1) select a first selected scatterer from the plurality of scatterers, (2) determine first signatures for launching from the plurality of antennas a first transmission temporally and spatially focused on the first selected scatterer, each first signature corresponding to a different antenna of the plurality of antennas, (3) select a second selected scatterer from the plurality of scatterers, the second selected scatterer being different from the first selected scatterer, and (4) determine second signatures for launching from the plurality of antennas a second transmission temporally and spatially focused on the second selected scatterer, each second signature corresponding to a different antenna of the plurality of antennas;
convolve first data with said each first signature to obtain first transmission waveforms, a first transmission waveform per antenna of the plurality of antennas;
convolve second data with said each second signature to obtain second transmission waveforms, a second transmission waveform per antenna of the plurality of antennas;
transmit to the intended receiver the first transmission waveforms from the antennas of the plurality of antennas, each first transmission waveform transmitted through the antenna corresponding to said each first transmission waveform, so that the first data is temporally and spatially focused on the first selected scatterer; and
transmit the second transmission waveforms from the antennas of the plurality of antennas, each second transmission waveform transmitted through the antenna corresponding to said each second transmission waveform, so that the second data is temporally and spatially focused on the second selected scatterer.

17. A radio frequency communication system according to claim 11, wherein the radio frequency communication system comprises a plurality of ad hoc nodes movable relative to each other and synchronized with each other, at least one antenna of the plurality of antennas per ad hoc node of the plurality of ad hoc nodes.

18. A method of transmitting data from a first radio frequency communication system to a second radio frequency communication system, the method comprising:
- receiving by a plurality of antennas of the first radio frequency communication system waveforms that resulted from sounding environment using one or more channel sounding bursts transmitted from the second radio frequency communication system, the waveforms comprising reflections of the one or more channel sounding bursts from one or more scatterers;
- step for processing the waveforms using time-reversal and Singular Value Decomposition to (1) select a first selected scatterer from the one or more scatterers, and (2) determine first signatures for launching from the plurality of antennas a first transmission temporally and spatially focused on the first selected scatterer, each first signature corresponding to a different antenna of the plurality of antennas;
- convolving first data with said each first signature to obtain first transmission waveforms, a first transmission waveform per antenna of the plurality of antennas; and
- transmitting the first transmission waveforms from the antennas of the plurality of antennas, each first transmission waveform transmitted through the antenna corresponding to said each first transmission waveform, so that the first data is temporally and spatially focused on the first selected scatterer.

* * * * *